(12) United States Patent
Chuang

(10) Patent No.: US 11,605,849 B2
(45) Date of Patent: Mar. 14, 2023

(54) THERMAL MANAGEMENT SYSTEM FOR HIGH POWER ELECTRICAL EQUIPMENT

(71) Applicant: Mintron Energy Technology Co., Ltd., Taoyuan (TW)

(72) Inventor: Chia-Ming Chuang, Taoyuan (TW)

(73) Assignee: MINTRON ENERGY TECHNOLOGY CO., LTD., Taoyuan (TW)

(*) Notice: Subject to any disclaimer, the term of this patent is extended or adjusted under 35 U.S.C. 154(b) by 330 days.

(21) Appl. No.: 16/755,471

(22) PCT Filed: Nov. 12, 2018

(86) PCT No.: PCT/CN2018/115021
§ 371 (c)(1),
(2) Date: Apr. 10, 2020

(87) PCT Pub. No.: WO2019/096090
PCT Pub. Date: May 23, 2019

(65) Prior Publication Data
US 2021/0210810 A1    Jul. 8, 2021

(30) Foreign Application Priority Data
Nov. 20, 2017   (CN) .......................... 201711153794.5

(51) Int. Cl.
*H01M 10/633*   (2014.01)
*H01M 10/613*   (2014.01)
(Continued)

(52) U.S. Cl.
CPC ....... *H01M 10/633* (2015.04); *H01M 10/482* (2013.01); *H01M 10/486* (2013.01);
(Continued)

(58) Field of Classification Search
CPC ............. H01M 10/633; H01M 10/482; H01M 10/486; H01M 10/613; H01M 10/625;
(Continued)

(56) References Cited

U.S. PATENT DOCUMENTS 5,871,859 A * 2/1999 Parise ....................... H02J 7/02
  429/62
8,852,779 B2 * 10/2014 Kim ...................... H01M 10/60
  429/163
(Continued)

FOREIGN PATENT DOCUMENTS

CN    101533933 A  *  9/2009
CN    101533933 A     9/2009
(Continued)

OTHER PUBLICATIONS

Machine Translation CN 206340627 U (Year: 2017).*
(Continued)

*Primary Examiner* — Len Tran
*Assistant Examiner* — Gustavo A Hincapie Serna
(74) *Attorney, Agent, or Firm* — Che-Yang Chen; Law Office of Michael Chen

(57) ABSTRACT

A thermal management system for high power electrical equipment includes temperature adjustment means, sensing means, and a microcontroller. The temperature adjustment means includes small and large temperature adjustment units and a selection device, wherein the small and large temperature adjustment units are thermally connected to the battery cells and the battery enclosure, respectively. The sensing means includes temperature sensors for measuring the temperatures of the battery cells, and capacity sensors for measuring the remaining capacities of the battery cells available for the electrical equipment, wherein the temperature and capacity sensors can output corresponding signals.

(Continued)

The microcontroller receives the signals from the temperature and capacity sensors, and enables or disenables the temperature adjustment means according to the temperature signals. Next, the microcontroller operates the selection device to start the small temperature adjustment unit and/or the large temperature adjustment unit according to the capacity signals when the temperature adjustment means is enabled.

5 Claims, 12 Drawing Sheets

(51) Int. Cl.
  H01M 10/625    (2014.01)
  H01M 10/6568   (2014.01)
  H01M 10/6572   (2014.01)
  H01M 10/48     (2006.01)
(52) U.S. Cl.
  CPC ....... *H01M 10/613* (2015.04); *H01M 10/625* (2015.04); *H01M 10/6568* (2015.04); *H01M 10/6572* (2015.04)
(58) Field of Classification Search
  CPC ......... H01M 10/6568; H01M 10/6572; H01M 10/48; H01M 2010/4278; H01M 10/425; H01M 10/63; B60L 1/02; B60L 3/0007; B60L 50/64; B60L 2240/545; B60L 58/26
  USPC ........................................................ 165/80.4
  See application file for complete search history.

(56) References Cited

U.S. PATENT DOCUMENTS

| | | | | |
|---|---|---|---|---|
| 9,088,057 B2* | 7/2015 | Kim | ...................... | H02J 7/0091 |
| 2008/0012535 A1* | 1/2008 | Takatsuji | ............. | H01M 10/42 |
| | | | | 903/907 |
| 2008/0311466 A1* | 12/2008 | Yang | ................... | H01M 10/613 |
| | | | | 429/62 |
| 2010/0212339 A1* | 8/2010 | Kelty | ...................... | B60L 58/26 |
| | | | | 62/157 |
| 2010/0243346 A1* | 9/2010 | Anderson | ........... | H01M 10/625 |
| | | | | 180/65.21 |
| 2012/0025762 A1* | 2/2012 | Lienkamp | ............. | H01M 10/63 |
| | | | | 324/426 |
| 2013/0029193 A1* | 1/2013 | Dyer | ................. | H01M 10/6567 |
| | | | | 180/65.21 |
| 2013/0166119 A1* | 6/2013 | Kummer | ............. | H01M 10/625 |
| | | | | 701/22 |
| 2013/0199217 A1* | 8/2013 | Arai | ........................ | B60L 58/26 |
| | | | | 62/190 |
| 2013/0249277 A1* | 9/2013 | Park | ..................... | H01M 10/625 |
| | | | | 307/9.1 |
| 2013/0280561 A1* | 10/2013 | Tolkacz | ................ | B60W 10/26 |
| | | | | 429/50 |
| 2014/0326430 A1* | 11/2014 | Carpenter | .......... | B60H 1/00278 |
| | | | | 165/41 |
| 2015/0311572 A1* | 10/2015 | Sung | ....................... | B60L 58/26 |
| | | | | 429/62 |
| 2015/0333304 A1* | 11/2015 | Sekine | ................ | H01M 10/625 |
| | | | | 429/153 |
| 2016/0075214 A1* | 3/2016 | Hamamoto | ........ | B60H 1/00921 |
| | | | | 62/160 |
| 2016/0195340 A1* | 7/2016 | Bissell | ..................... | F28D 20/02 |
| | | | | 165/10 |
| 2017/0110770 A1* | 4/2017 | Marcicki | ................ | B60K 11/02 |
| 2017/0232865 A1* | 8/2017 | Christen | ............. | H01M 10/613 |
| | | | | 429/120 |
| 2017/0305292 A1* | 10/2017 | Minamiura | ........... | H01M 50/20 |

FOREIGN PATENT DOCUMENTS

| | | | | |
|---|---|---|---|---|
| CN | 102376995 | A | | 3/2012 |
| CN | 102376995 | B | | 2/2015 |
| CN | 206340627 | U | * | 7/2017 |
| CN | 206340627 | U | | 7/2017 |
| EP | 2924797 | B1 | | 5/2017 |
| EP | 3654445 | A4 | * | 2/2021 ........ H01M 10/0481 |
| GB | 2581483 | A | * | 8/2020 ............. B60L 1/003 |

OTHER PUBLICATIONS

CN 101533933A Machine Translation (Year: 2009).*
Examination Report of corresponding SG application, published on Dec. 17, 2021.
Notice of Grant of Patent of corresponding IN application, published on Oct. 26, 2021.
Notice of Grant of Patent of corresponding CN application, published on Jun. 1, 2022.

* cited by examiner

THERMAL MANAGEMENT SYSTEM FOR HIGH POWER ELECTRICAL EQUIPMENT

FIELD OF THE INVENTION

The present invention relates to a thermal management system for high power electrical equipment.

BACKGROUND OF THE INVENTION

Under the global climate warming and change, the demand for energy has gradually shifted from fossil fuel to renewable resources, so that emissions of greenhouse gas can be reduced, and thus slow down the global warming trend and increase the air quality. With the development of battery cells technology, electricity is gradually replacing gasoline as the main power source.

Lithium-ion batteries are often used as the power source of electric vehicles. Improper temperature management for lithium-ion batteries would cause fast depletion of lithium ion. Thus, if lithium-ion batteries are not operated at a normal temperature, their service life is very limited. Moreover, the cost of the lithium-ion batteries account for about one third of the cost of an electric vehicle, which leads to an extremely high cost for replacing the degraded lithium-ion batteries, so that electric vehicles are not widely accepted.

The service life of the battery cells of an electric vehicle is short compared with that of a conventional vehicle. Furthermore, the replacement cost of the battery cells of an electric vehicle is usually much higher than the maintenance cost of a conventional vehicle. For a newly purchased electric vehicle, the battery cells may be degraded in a few years, so that they are unable to store their original capacity, that is to say, the mileage of the electric vehicle under a fully charged battery is reduced. Widespread acceptance of electric vehicles still faces huge challenges and obstacles. For this reason, there is a growing need for developing a thermal management system for high power equipment, which can control the temperature of the battery cells in a stringent range, so that the service life of the battery cells can be increased to more than 10 years, thus facilitating market development of electric vehicles.

While an electric vehicle is running, its battery cells receive heat not only from the charging/discharging process, but also from the motor and the environment. When the temperature of the battery cells rises from 20 degrees to 30 degrees C., the battery service life will be halved. Similarly, when the temperature of the battery cells rises from 30 degrees to 38 degrees C., the battery life will be halved again. The higher the temperature of the battery cells is, the faster the service life of the battery cells is reduced. If the battery system is not provided with a cut off protection device, or the cut off device failed to stop the battery reaction in time, temperature will rise rapidly, causing the protective solid to electrolyte interphase to decompose, the separator to melt, the battery anode and cathode to short circuit, and the resulting large amount of gas generated will burst through the cell vent and set fires to its surrounding parts. However, conventional thermal management system stops working when the driver leaves the seat and pulls out of the key. Although the battery cells do not perform charging and discharging process, if the temperature of the battery cells is higher than 60 degrees C. and the heat generated by the self reaction is not drawn out, the temperature of the battery cells will rise slowly. When the temperature of the battery cells is higher than 100 degrees C., the reactions within the battery cells accelerates. As a result, in less than one hour, the separator will melt and the battery short circuited, and high temperature gas would leak out of the battery cells to cause fire accidents. These common characteristics exist in all lithium-ion battery systems, which may account for the self-ignition of electric vehicles and standby mobile phones.

For concern about the safety of battery cells at high temperature, some manufacturers have proposed a thermal management system, wherein a cooling device is employed to adjust the temperature of the battery cells by using a coolant to increase the safety. However, in an application, wherein 18650 lithium-ion battery cells are arranged in a box and connected in series or parallel, and there is only 1 mm of gap between two adjacent cells, it is impossible to install a cooler within the box. FIG. 1 shows a battery pack provided with a conventional thermal management system, wherein a circulation tube 80 is routed through the cells of the battery pack and along one side of the case 90 of the battery pack, and a cooling device 8 is provided for the battery pack to reduce the temperature of the coolant within the circulation tube 80, so that the heat energy contained in the cells and at the case can be drawn out. In the conventional system, the cooling device 8 performs cooling on the cells 920 as well as the case 90. For an electric vehicle with the conventional system that travels on a summer day, the sunlight may cause the temperature of the battery case 90 to rise gradually, and even to exceed the temperature of the battery cells 920; consequently, the cooling device needs to work harder to dissipate the heat. Due to the battery case having a large heat capacity, if the cooling device is started when the temperature of the battery case reaches 30 degree Celsius, the cooling device cannot immediately stop the temperature of the battery cells from rising, that is to say, the temperature of the battery cells would continue rising to some extent and thereafter decrease gradually. This way of thermal management would adversely affect the service life of the battery cells.

The main function of a battery in an electric vehicle is to supply electricity required for running the vehicle's motor. While the battery provides electricity, it is required to make sure that the temperature of the battery cells is not too high. However, in conventional thermal management systems, when the remaining capacity of a battery is lower than a certain level, the cooling device still draws a large amount of power for performing cooling tasks, wherein most of the power is used on cooling the battery case. In conventional systems, the cooling device operated to cool the battery cells only; that is to say, when the battery is low in its stored energy, conventional systems still consumes electrical energy on cooling the battery case. When the temperature of the battery case is higher than that of the battery cells, it is difficult for the cooling device to control the temperature of the battery cells within an optimum temperature range.

In a conventional thermal management system, coolant is usually delivered by a pump to conduct a cooling task. However, when the remaining capacity of the battery cells is low, the pump still consumes electricity of the battery cells to deliver the coolant to cool the battery case. Except for further consumption of the barely stored energy of the battery, causing the electrical equipment supported by the battery unable to operate normally, it is difficult for the system to control the temperature of the battery cells within a suitable temperature range. Also, high operating temperature would accelerate the degradation of the battery and thus reduce the battery capacity, which means the cost for maintaining the electrical equipment would increase.

However, if the temperature of the battery cells is continuously reduced to an excessive low temperature due to excessive cooling, although this can prevent the thermal runaway described earlier, the discharging performance of the battery cells can be reduced, thus reducing the performance and power of the electrical equipment that is energized by the battery cells (such as an electric vehicle). In addition, the cost, reliability, safety, mileage, and driving performance of the electric vehicle can be affected adversely.

Due to the inefficiency of conventional thermal management systems and their energy use without considering priority of the events, the battery cells cannot work at an optimum temperature range, and thus are prone to degradation. On the other hand, an increase in charging/discharging frequency also shortens the service life of the battery cells. For an electrical vehicle that uses air cooling, the service life of the battery cells may be reduced to merely two years. For an electric vehicle provided with liquid-cooled battery, if it is used in cold environment, the service life of the battery cells can be extended to nearly ten years. By contrast, for the same electric vehicle in subtropical country areas and uses liquid to conduct cooling tasks, the service life of the battery cells is merely four years. Besides, replacement of all battery cells for electric vehicles is extremely expensive compared with fossil-fuel vehicles maintenance cost.

Of course, battery cells are also used in power generation facilities, wherein lead-acid batteries have been widely used. Lead-acid batteries cannot be charged quickly, and the service life is short. With development of lithium-ion battery cell technology and increasing concern for environmental protection, lithium-ion batteries are gradually used as an energy storage medium for wind or solar power generation facilities and load shifting applications. Although lithium-ion battery cells have a higher service life, their replacement cost is high compared with that of lead-acid batteries. Thus, there is a growing need for developing a thermal management system for lithium-ion batteries, which can control the temperature of the battery cells within a stringent range, so that the service life of the battery cells can be extended to be more than 10 years, and this would accelerate the use of lithium-ion batteries and replace lead-acid batteries as the main energy storage medium.

In view of the foregoing, a main purpose of the present invention is to provide a way to maintain the battery cells for high-power electrical equipment, which usually handle hundreds of amperes of current, at an optimal working temperature, so that the safety, usability, service life of the battery cells, and the total working hours of the electrical equipment can be increased.

SUMMARY OF THE INVENTION

One objective of the present invention is to provide a thermal management system for a battery pack for high power electrical equipment, wherein the temperatures of the battery cells and the remaining capacities of the battery cells are measured, and the system can perform a control sequence according to the measurement. When the remaining capacity of the battery cells is sufficient, the system can start a large temperature adjustment unit to have the battery cells work at an optimum temperature, so that degradation of the battery cells can be alleviated, the charging/discharging performance of the battery cells can be increased, and the service life and usability of the battery cells can be increased.

Another objective of the present invention is to provide a thermal management system for a battery pack for high power electrical equipment, wherein when the remaining capacity of the battery pack is low, the system can start a small temperature adjustment unit to reduce energy consumption of the battery pack, so that the total working hour of the electrical equipment such as an electric bus can be increased, and thus the mileage of the electric bus can be increased.

A further objective of the present invention is to provide a thermal management system for a battery pack for high power electrical equipment, which can evaluate the influence of environmental variables on the battery pack and thus can assess the impact on temperatures of the battery cells more accurately, so that a suitable cooling action can be taken in advance to make sure that the battery cells can work at an optimum operating temperature. In addition, the stored energy of the battery cells can be used more efficiently, and the possibility of thermal runaway minimized.

A still further objective of the present invention is to provide a thermal management system for a battery pack for high power electrical equipment, which can start a small temperature adjustment unit and/or a large temperature adjustment unit according to the temperatures and the remaining capacities of the battery cells. When the remaining capacity of the battery pack is sufficient, the battery cells can work at an ideal operating temperature with the large temperature adjustment unit. When the remaining capacity of the battery pack is low, a small temperature adjustment unit with reduced energy consumption is used to extend the operating time of the electrical equipment.

A yet still further objective of the present invention is to provide a thermal management system for a battery pack for high power electrical equipment, which can evaluate the influence of environmental variables on the electrical equipment and thus can assess the impact on temperatures of the battery cells more accurately, so that the temperatures of the battery cells can be maintained at an ideal temperature, the service life of the battery cells can be extended substantially, and the cost of operating the electrical equipment can be reduced.

To achieve the above objectives, one embodiment of the thermal management system, which enables the battery cells to work at a predetermined temperature range, comprises temperature adjustment means, sensing means, and a microcontroller. The temperature adjustment means includes at least one small temperature adjustment unit, at least one large temperature adjustment unit that has a thermal adjustment capacity greater than the small temperature adjustment unit, and at least one selection device for operating either of the small and large temperature adjustment units, wherein the small temperature adjustment unit is thermally connected to the cells, whereas the large temperature adjustment unit is thermally connected to the enclosure. The sensing means includes at least one temperature sensor for measuring the temperature of the cells, and at least one capacity sensor for measuring the remaining capacity of the cells available for the electrical equipment, wherein the temperature sensor can output signals representative of the temperature of the cells; the capacity sensor can output signals representative of the remaining capacity of the cells. The microcontroller can receive the signals from the temperature sensors and the capacity sensors, wherein the microcontroller decides whether or not to enable the temperature adjustment means according to the signals of the temperature of the cells, and can operate the selection device to start the small temperature adjustment unit and/or the large temperature adjustment unit according to the signals of the capacity of the cells when the temperature adjustment means is enabled.

Furthermore, another embodiment of the thermal management system, which enables the battery cells to work at a predetermined temperature range, comprises temperature adjustment means, an instrument, and a microcontroller. The temperature adjustment means includes at least one small temperature adjustment unit thermally connected to the cells. The instrument includes at least one temperature sensor and at least one environmental sensor, wherein the temperature sensor measures temperature of the cells and outputs signals representative of the temperature; the environmental sensor measures environmental condition and outputs signals representative of the environmental condition. The microcontroller receives the signals from the temperature sensor and the environmental sensor, wherein the microcontroller decides whether or not to enable the temperature adjustment means according to the signals of the temperature and the signals of the environmental condition.

The thermal management system of the present invention is particularly suitable for an independent high-power electrical equipment that can handle hundreds or thousands amperes of current, but unable to be energized by external public power grid. Through the sensing means, the system can evaluate external heat sources, the remaining capacities of the battery cells, and environmental variables, whereby a suitable temperature adjustment unit can be started to adjust the temperature of the battery cells. When the remaining capacity of the battery pack is low, a small temperature adjustment unit with reduced energy consumption is used to extend the operating time of the electrical equipment.

Furthermore, when the safety system in the electrical equipment detect an imminent catastrophic event such as a collision impact or overturn, a preferred embodiment of the present invention will activate the large temperature adjustment unit to lowered the battery temperature quickly and to consumed the stored energy quickly in order to prevent the battery cells going into thermal run away from the catastrophic event.

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The foregoing and other technical contents, features and advantages of the present invention will be illustrated in detail by way of exemplary embodiments with reference to the accompanying drawings. In the exemplary embodiments, same elements will be indicated by similar numerals or labels.

Figure 1:
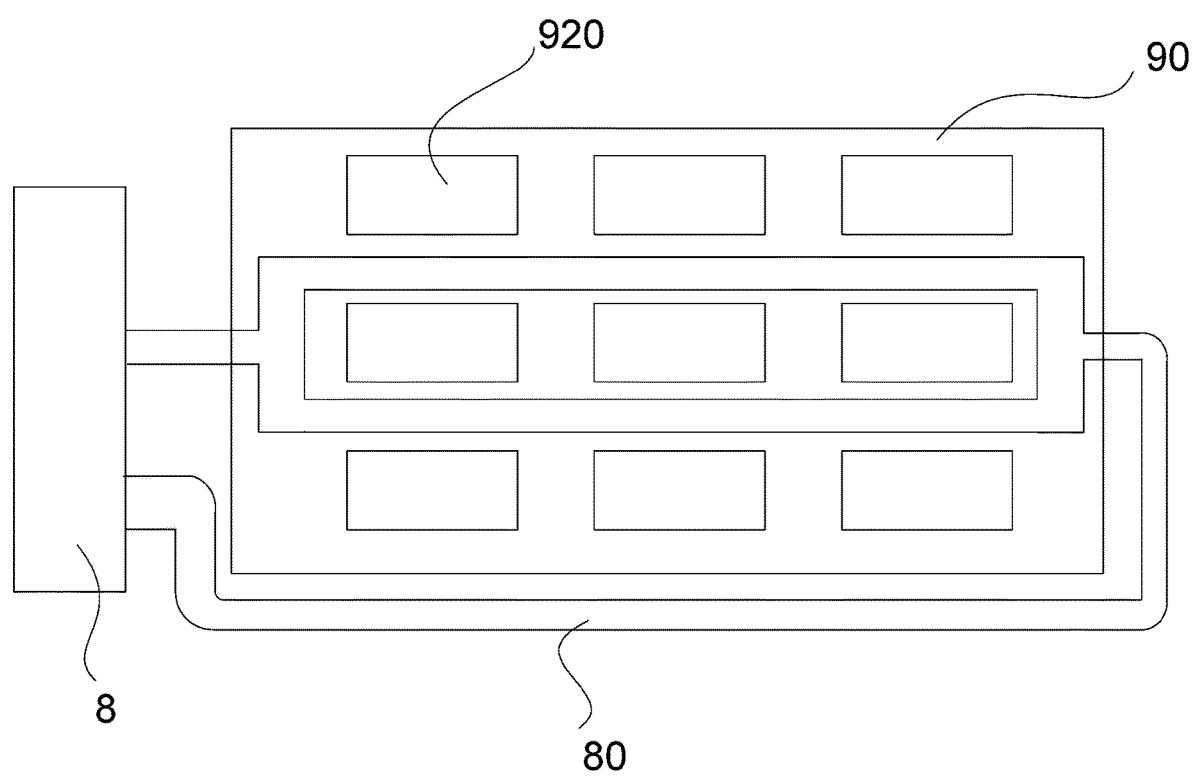
FIG. 1 shows a schematic view of a conventional thermal management system for a battery pack.
Figure 2:
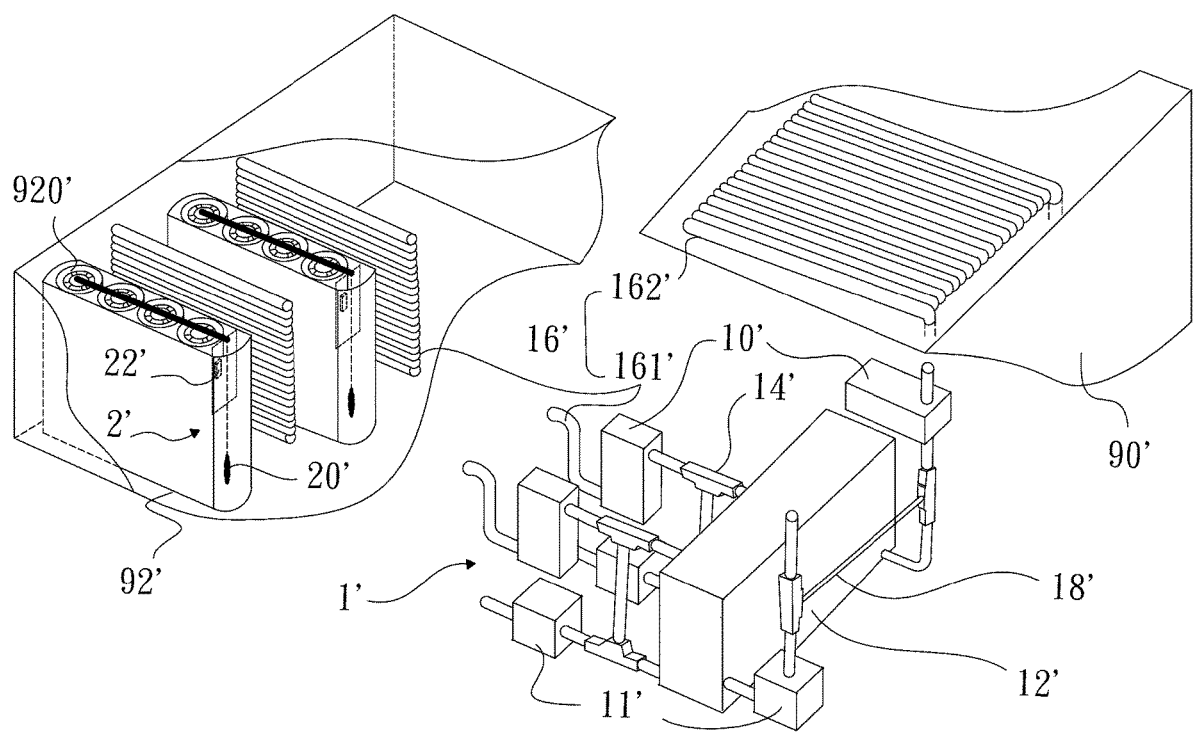
FIG. 2 shows a schematic exploded view of a thermal management system for a battery pack for high power electrical equipment according to a first embodiment of the present invention.
Figure 3:
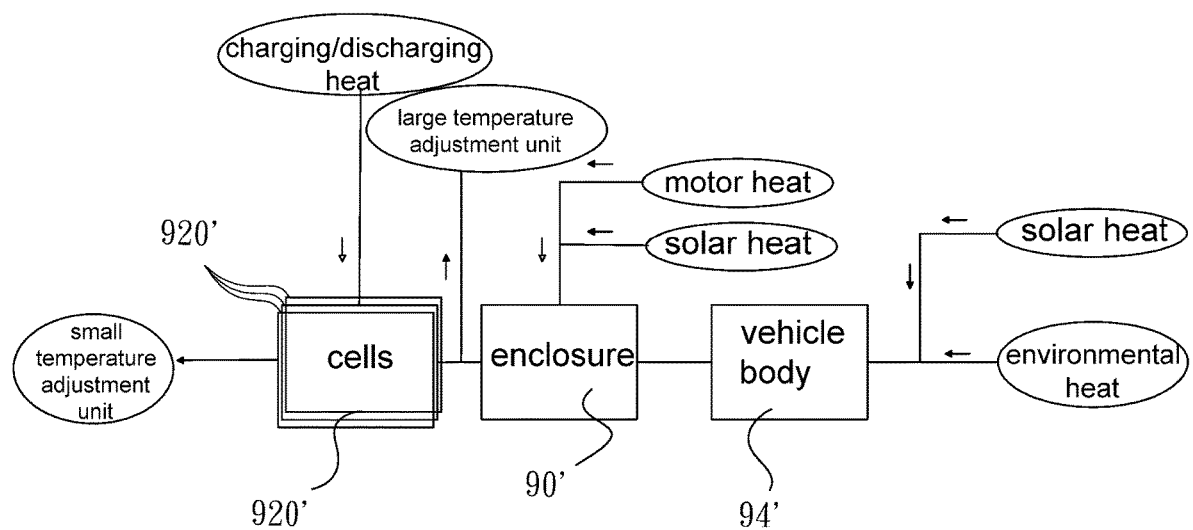
FIG. 3 shows a diagram illustrating various heat sources that affects the battery pack shown in FIG. 2.

FIG. 2 shows an exploded view of a thermal management system for high power electrical equipment according to a first embodiment of the present invention, wherein the electrical equipment, which can be illustrated as an electric vehicle, which is furnished with a battery pack, which generally contains multiple cells accommodated in an enclosure. FIG. 3 shows various heat sources that can affect the performance of the battery pack. As shown, the heat sources include sunlight, motor heat, and heat produced from battery charging/discharging, wherein radiant heat of sunlight can be introduced to the battery enclosure 90' via the vehicle body 94', especially when the vehicle is running on a summer day. During charging/discharging process, the temperature of the battery cells 920' may increase. Additionally, the battery enclosure 90' and the battery cells 920' are subjected to heat from the external environment and the vehicle while running, which may further cause the temperature of the battery cells to increase.

The cells of the battery pack can be grouped into a plurality of modules 92', wherein each module 92' is composed of a plurality of cells 920', and all of the modules 92' are accommodated in the enclosure 90'. For example, when using 18650 lithium-ion cells, each module 92' may contain dozens of cells, while the battery pack may contain dozens to hundreds of modules. Each module 92' is installed with a temperature sensor 20' so as to measure the temperature of the battery module 92'. Also, the enclosure 90' can be installed with a temperature sensor so as to monitor the temperature of the enclosure. Furthermore, each module 92' is installed with a capacity sensor 22' to measure the remaining capacity of the module available for the electric vehicle. The temperature sensors 20' and the capacity sensors 22' are referred herein to as sensing means 2'. Each temperature sensor 20' and each capacity sensor 22' can output the temperature and capacity of a corresponding module to a microcontroller (not shown). Of course, the capacity sensors can be installed in various configurations without hindering implementation of the present invention. For example, each capacity sensor can be located at a control circuit board dedicated for a module; or alternatively, all of the capacity sensors can be located at a single control board. If necessary, each cell can be installed with a capacity sensor.

In this embodiment, the temperature adjustment means 1' includes a small temperature adjustment unit 10', a large temperature adjustment unit 12', and a selection device 14', such as a solenoid valve for selectively operating the small temperature adjustment unit 10' and the large temperature adjustment unit 12'. The small temperature adjustment unit 10' is thermally connected to the cells 920' by way of an internal thermal conduit 161', which is a part of a thermal path 16'. The large temperature adjustment unit 12' is thermally connected to the enclosure 90' by way of an external thermal conduit 162', which is a part of the thermal path 16'. In one embodiment, the large temperature adjustment unit 12' can be connected to the small temperature adjustment unit 10'. Also, a coolant pump 11' can be provided in the system to force a coolant to flow along the thermal conduits and to flow through the small and large temperature adjustment units 10', 12'. The coolant can be a liquid mixture of water and an antifreeze, such as ethylene glycol or propylene glycol, so that the coolant can be prevented from being frozen at a low temperature. Each of the small and large temperature adjustment units 10', 12' is provided with heat dissipation means (not shown), such as a refrigerant-based cooler, so that the heat contained in the coolant of the thermal conduits can be dissipated effectively. Due to a large heat capacity, the coolant can absorb a large amount of heat due to a large heat capacity. The coolant pump 11' can force the coolant to flow through the small temperature adjustment unit 10' and/or the large temperature adjustment unit 12', at which the heat contained in the coolant can be dissipated, so that coolant contained in the thermal conduits can be cooled. On the other hand, the coolant can flow through the interior of the enclosure via the large temperature adjustment unit 12'. For an electric vehicle intended to travel on a sunny day, in the beginning, due to the large heat capacity of the coolant, the sunlight is incapable of raising the temperature of the battery module 92' significantly. Under these circumstances, the temperature adjustment means 1' is not necessary to be enabled.

For conventional temperature adjustment devices used in electric vehicles, they are usually started after the coolant temperature has increased by two or three degrees due to the solar heat, road radiant heat, and motor heat. However, under the combined effect of direct sunlight, road radiant heat, motor heat, and the heat produced from charging/discharging process, the temperature of the cells 920' still continues to rise by more than 10 degrees C., and then under strong operation of the temperature adjustment devices, the cell temperature decreases gradually back to become normal.

Figure 4:
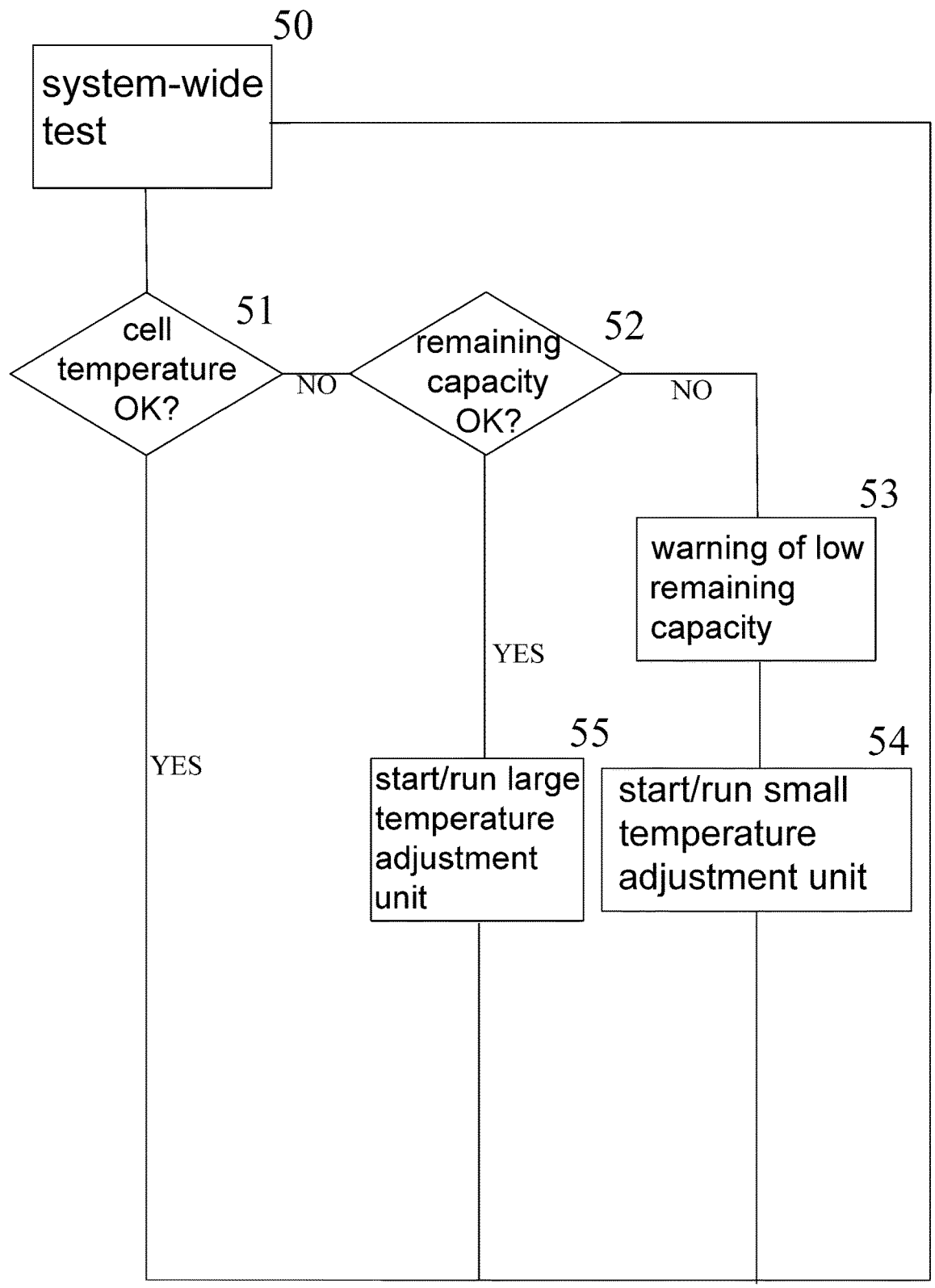
FIG. 4 shows a flowchart illustrating a control sequence for the system shown in FIG. 2.

FIG. 4 shows a flowchart of a control method for the thermal management system. In step 50, the microcontroller conducts a system-wide test for the battery pack when the electric vehicle is started. In step 51, the microcontroller receives the temperatures of the enclosure 90' and the battery modules 92' from the temperature sensors 20' to calculate the heat energy having been introduced to the battery pack, and decides whether the temperatures of the battery modules 92' are below a predetermined temperature threshold. if the answer is no, step 52 will be executed, wherein the microcontroller receives the remaining capacities of the battery modules 92' from the capacity sensors 22' and decides whether the remaining capacity of the battery pack (battery modules 92') exceeds a predetermined capacity threshold; if yes, step 55 will be executed, wherein the large temperature adjustment unit 12' will be started so that the enclosure 90' and the battery modules 92' can be cooled down.

The enclosure 90' receives solar heat, road radiation, and motor heat earlier than the battery modules 92'. Since the enclosure 90' is installed with a temperature sensor, which can detect a higher temperature of the enclosure more easily, the large temperature adjustment unit 12' can be started earlier than the counterpart of conventional thermal management system. In addition, the coolant, which flows through the battery cells 920' and the enclosure 90', can alleviate the thermal effect of the heat sources outside of the enclosure 90', so that the temperature of the battery cells 920' can be controlled within one degree Celsius of an ideal temperature, thus increasing the service life of the battery cells 920'. Since the large temperature adjustment unit 12' is not necessary to be operated for cooling the battery pack, the electrical energy stored in the battery case can be used effectively.

On the other hand, if the remaining capacity of the battery pack (battery modules 92') is insufficient and less than the predetermined capacity threshold, the microcontroller can command an alarming device (not shown) to issue a warning to the driver of the electric vehicle (see step 53). For example, the microcontroller can command a speaker within the vehicle to play a recorded sound. At the same time, the microcontroller can start the small temperature adjustment unit 10', which only forces the coolant to flow through the battery modules 92', wherein the enclosure 90' is not taken into consideration; through a circulation conduit 18', the coolant can bypass the large temperature adjustment unit 12'. The reasons are that, when the remaining capacity of the battery pack is limited, the vehicle driver should find a charging station as soon as possible to prevent the vehicle from being forced to stop by the road, rather than to consider the service life of the battery cells 920'. Thus, when the remaining capacity of the battery pack is insufficient, only the small temperature adjustment unit 10' will be operated so that the battery cells 920' can work at a barely qualified environment to save energy consumption, so that the travel distance of the vehicle can be extended.

Electric vehicles are different from fossil-fuel vehicles in that battery overheat may cause one or more cells 920' to go into thermal run away and trigger a chain reaction to other battery cells. However, battery cells outfitted with a preferred embodiment of the present invention thermal management system can keep the battery cells in prescribed temperature range until the capacity is low, and continue to keep battery cells temperature safe until the capacity is exhausted. Battery cells with no capacity left are safe and would not go into thermal run away even at elevated temperatures. Present invention thermal management system can effectively solve the problem of unattended electric vehicle burst into flame due to elevated temperature and lack of robust thermal management system.

In this embodiment, those skilled in the art can understand that the small and large temperature adjustment units 10', 12' can be based on heat exchangers or devices that can dissipate the heat contained in the coolant; the selection device 14' can be a 3-way, 2-position solenoid valve; the temperatures of the battery modules can be taken into consideration before the capacities of the battery modules in a control sequence. However, other devices or ways for conducting thermal management on the battery pack can be used without hindering implementation of the present invention. For example, the capacities of the battery modules can be considered before the temperatures of the battery modules; other types of control valves can be used instead of solenoid valves; the pump together with the coolant can be replaced by other devices and mediums, and according to the temperatures or the remaining capacities of the battery modules or other variables, a control sequence can be taken to adjust the temperatures of the battery modules and the enclosure.

Figure 5:
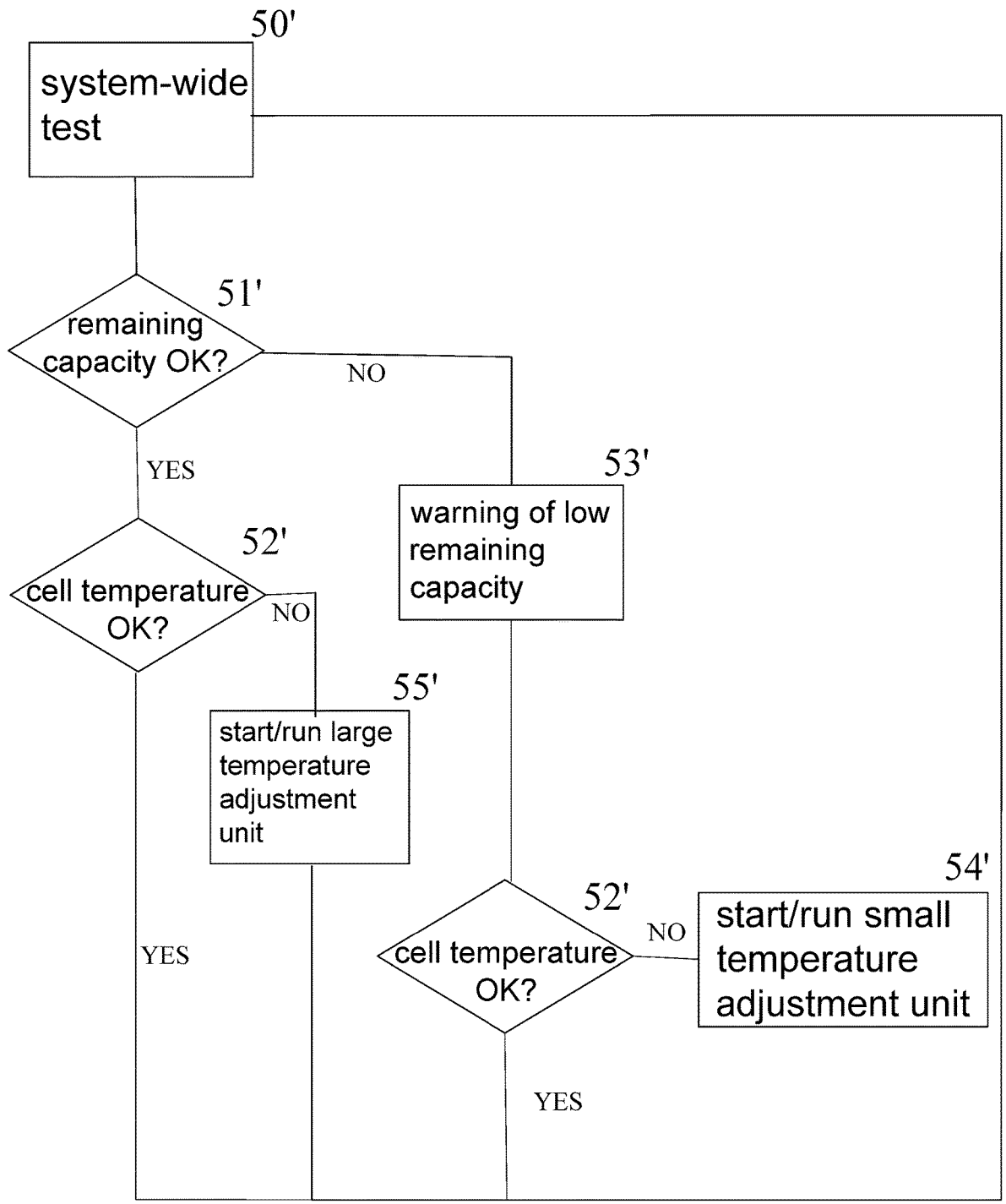
FIG. 5 shows a flowchart illustrating a control sequence for the system shown in FIG. 6.
Figure 6:
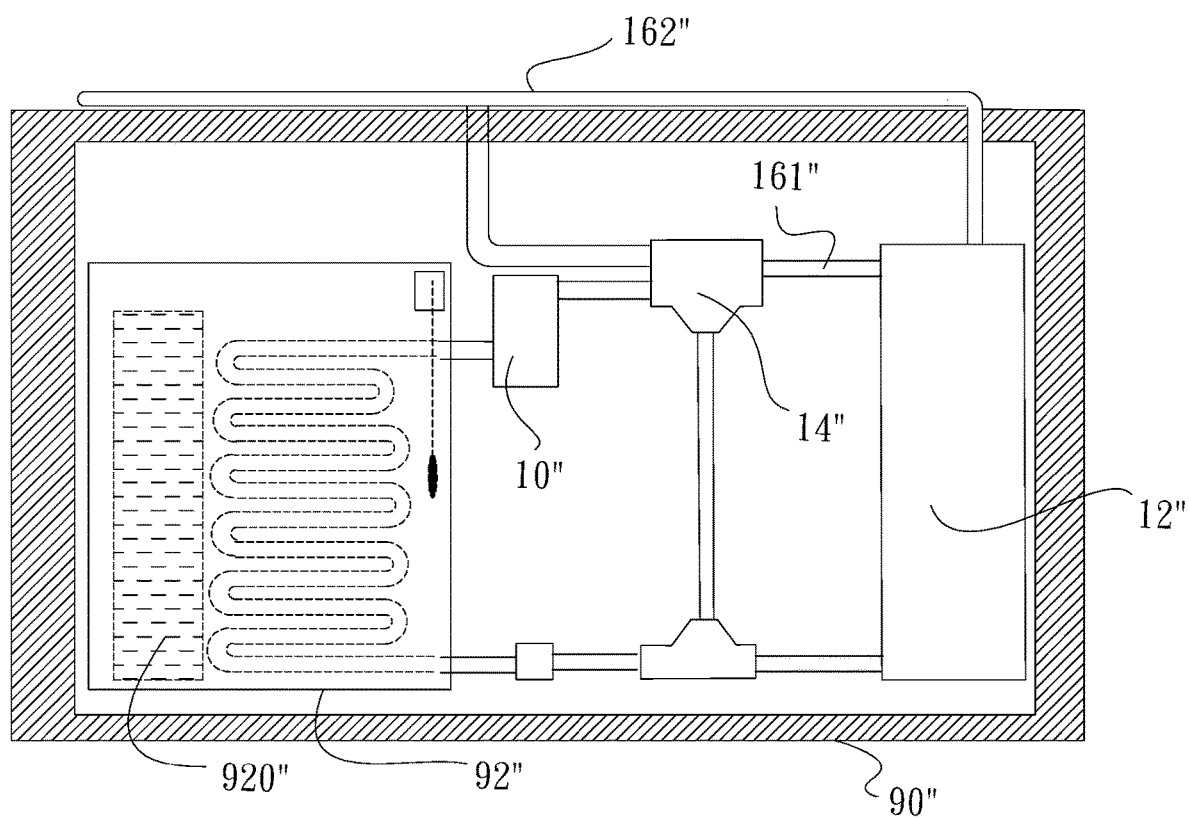
FIG. 6 shows a sectional view of a thermal management system for a battery pack for high power electrical equipment according to a second embodiment of the present invention.

FIGS. 5 and 6 illustrate a second embodiment of the present invention, wherein the capacities of the battery modules 92" are taken into consideration before the temperatures of the battery modules 92", contrary to the control sequence of the first embodiment. FIG. 5 shows a flowchart, wherein the microcontroller evaluates the remaining capacity of the battery pack (battery modules 92") (step 51') according to the signals sent from the capacity sensors (not shown) after conducting a system-wide test (step 50'). Thereafter, in step 52', the microcontroller obtains the temperatures of the battery modules 92" and the enclosure 90" according to the signals sent from the temperature sensors (not labeled). If the capacity of the battery pack is greater than the predetermined capacity threshold, and the temperatures of the battery modules 92" each are one degree greater than a normal operating temperature (for example 17 degrees C.), the large temperature adjustment unit 12" will be enabled (see step 55'), so that the temperature of the enclosure 90" as well as the temperatures of the battery modules 92" can be reduced. In particular, the temperature of the enclosure 90" can be reduced to a value slightly lower than the temperatures of the battery modules 92", so that the environmental heat sources and the motor heat cannot pass through the enclosure 90" to affect the battery cells 920", that is to say, the temperatures of the battery cells 920" are merely affected by the heat produced from the cells themselves.

In the second embodiment, only the large temperature adjustment unit 12" is installed with thermal dissipation means (not shown) for cooling the coolant flowing through the small and large temperature adjustment units 10', 12' that are selectively connected through a selection device 14". As such, the large temperature adjustment unit 12' involves the internal thermal conduit 161" corresponding to the battery cells 920" (which are grouped into at least one module 92") as well as the external thermal conduit 162" corresponding to the battery enclosure 90", whereas the small temperature adjustment unit 10" involves only the internal thermal conduit 161", which is associated with the battery cells 920", and can be selectively connected with the large temperature adjustment unit 12" through the section valve 14". The selection device 14" can be operated to enable the small temperature adjustment unit 10" or the large temperature adjustment unit 12". Therefore, when the capacity of the battery pack is sufficient, the large temperature adjustment unit 12" will be enabled, and thus the battery cells as well as the enclosure can be maintained at a reasonable temperature. On the other hand, when the capacity of the battery pack is insufficient, the selection device 14" can be operated such that the coolant can bypass the large temperature adjustment unit 12", and only the small temperature adjustment unit 10" can be enabled, so that the battery cells 920" are controlled at a temperature barely suitable for operation of the battery pack. As a result, most of the remaining capacity of the battery pack can be used by the vehicle to extend its travel distance.

Of course, the battery cells are not limited to be in parallel, thermal connection with the enclosure via the thermal conduits. Those skilled in the art may modify the design of the present invention such that the battery cells are in serial thermal connection with the enclosure to achieve the purpose of adjusting the temperatures of the battery cells and the enclosure. Also, the thermal conduits can be routed in different configurations or can be made by using a material of low thermal resistance to achieve the requirements of the enclosure, the battery cells, and the electrical equipment without hindering implementation of the present invention.

On the other hand, if the remaining capacity of the battery pack (battery modules 92") is lower than the predetermined capacity threshold, the microcontroller can issue a warning message to an alarming device or a display (see step 53'). Under these circumstances, only the small temperature adjustment unit 10" will be enabled (see step 54'), so that part of the energy consumed for cooling the battery pack can be saved and used by the motor of the electric vehicle, as illustrated in the first embodiment, so that the travel distance of the vehicle can be increased. The alarming device can be a buzzer, a speaker, multimedia audio and video equipment, or GSM/UMTS/LTE device for issuing text messages or emails, either of which can remind the vehicle driver of going to a charging station as soon as possible, so that excessive discharging of the battery cells, which may cause battery degradation, can be avoided, and thus the service life of the battery cells can be increased.

It is noticed that the electrolyte within the battery cells has a high specific capacity. It takes some time for the heat produced from charging/discharging process in each cell to affect the outer surface of the cell, so that there is a temperature difference between the outer surface and the center of the cell. In other words, the temperature at the center of a cell would lag behind the temperature at the outer surface of the cell. On the other hand, because the coolant has a high specific capacity, resulting in the external heat sources difficult to affect the temperature sensors of the cells, there is also a temperature difference between the enclosure and each of the battery cells. In other words, if the temperature within a cell is measured by using the temperature sensor located at the outer surface of the cell, or the effect of external heat sources on the cell is evaluated by the temperature sensor at the outer surface of the cell, there would be a misleading result due to time lag. Similarly, due to time lag of measurement, the temperature sensor installed at the enclosure has difficulty measuring the temperatures of the battery cells accurately. This may account for why the temperature of a battery pack for high power equipment, such as an electrical vehicle, could not be maintained at an ideal operating temperature.

Figure 7:
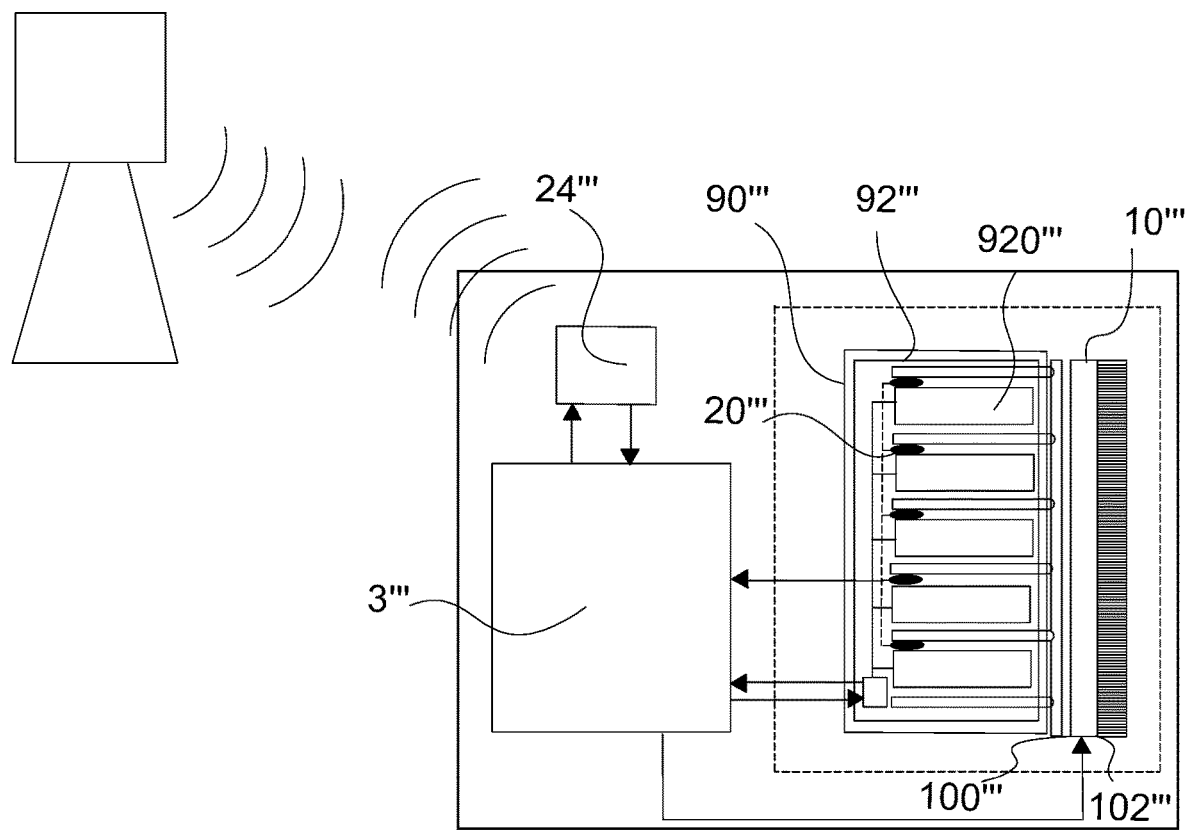
FIG. 7 shows a schematic view of a thermal management system for a battery pack for high power electrical equipment according to a third embodiment of the present invention.
Figure 8:
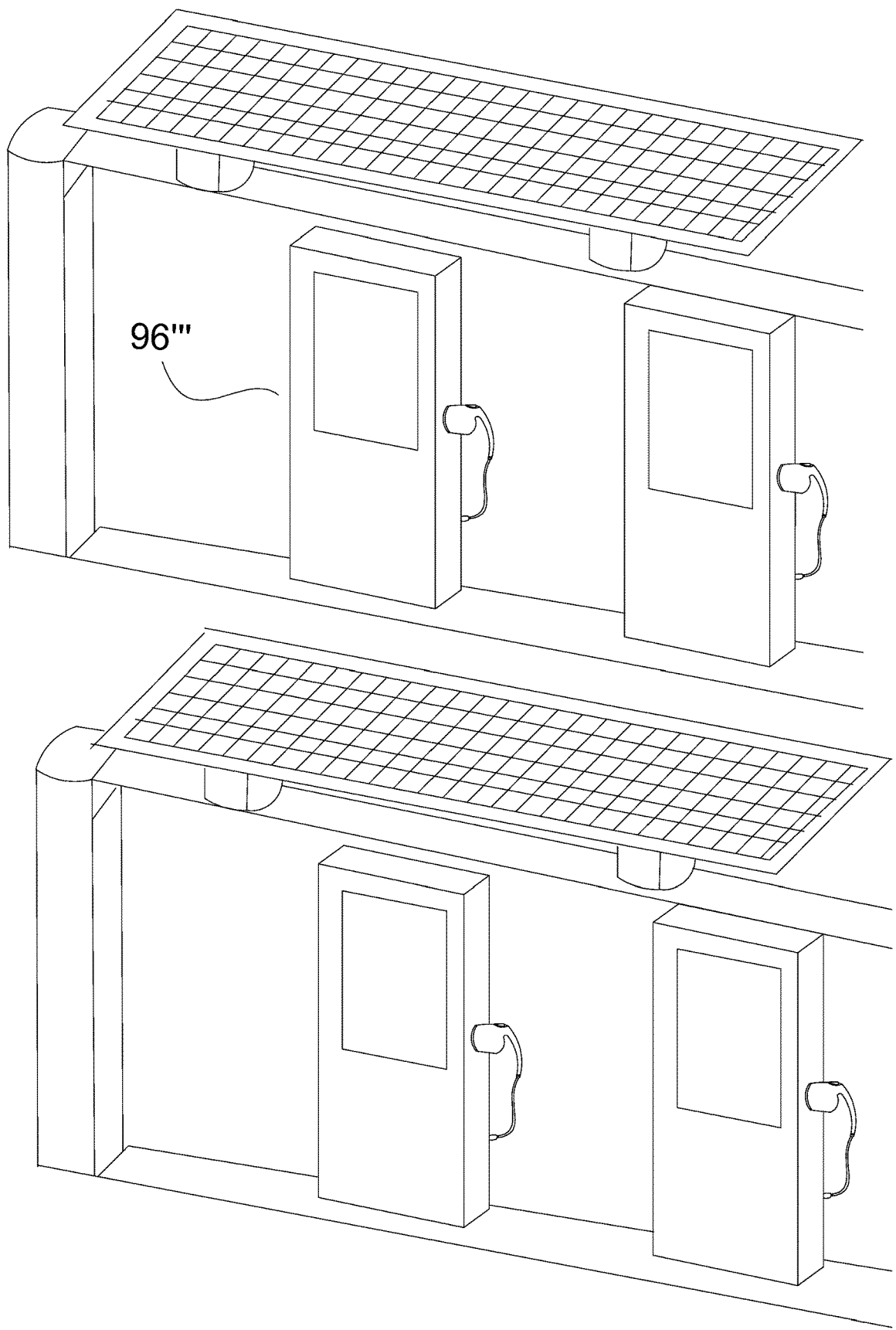
FIG. 8 shows a schematic 3-dimensional view of a charging station that uses the thermal management system shown in FIG. 7.

FIGS. 7 and 8 show a third embodiment of the present invention, wherein an independent charging station 96''' incorporating a thermal management system is shown. The thermal management system comprises temperature adjustment means, sensing means, and a microcontroller 3". As electric vehicles are becoming more and more popular, even in wild area, charging stations are built along a road at intervals. For this kind of charging stations, an electrical connection by cables from remote sites may spend a huge amount of money. It is preferred that the charging stations are energized by wind or solar power and provided with battery modules 92''' to store the energy. As such, the rest area and service area near the charging station may rely on the battery modules 92''' as an energy source. However, during charging/discharging process, the battery cells 920''' can produce a lot of heat. Furthermore, there may be great variations in environmental temperature. These factors may adversely affect the operation of the battery cells 920''', leading to frequent maintenance of the charging station, service life reduction of the battery cells, and higher cost of operating the charging station. The following paragraphs further illustrate how to manage the heat produced in a battery pack for independent high-power electrical equipment.

Of course, those skilled in the art may set a predetermined temperature threshold to turn the thermal controller on or off. But it is much better to set the temperature threshold dynamically in real time. To determine the temperature threshold, various variables or parameters can be taken into consideration, wherein the heat contained in the battery cells, the coolant and the enclosure, the heat capacity and heat transfer characteristics of the foregoing elements are known. In this embodiment, environmental influences such as solar radiation and heat radiation from road surface are also taken into consideration. By using regression analysis to incorporate these variables, in real time, battery cell temperature can be controlled within a very tight range.

The charging station includes at least one battery pack, wherein a number of cells 920''' can be grouped into one or more modules 92''' and located in an enclosure 90'''. Each cell 920''' is installed with a temperature sensor 20''', and each module 92''' is installed with a thermoelectric cooler (TEC) 10''', which can be used as temperature adjustment means. The thermoelectric cooler 10''' can be made of p-type element (holes as the majority current carrier) and n-type element (electrons as the majority current carrier). When a current is applied to the thermoelectric cooler 10''', a temperature difference can be induced, wherein the majority current carriers can be forced to move from one side (cold side) to the other side of the element (hot side). As the current increases, the temperature gradient increases. As shown in FIG. 7, the thermoelectric cooler 10''' has a cold side 100''' in contact with outer surface of a module 92''', and a hot side 102''' in contact with a thermal path, such as radiating fins, which can take away the heat accumulated at the hot side 102''', so that the temperature at the hot side 102''' can be maintained at a predetermined temperature range.

Particularly, since the thermoelectric cooler 10''' is small in size compared to typical temperature adjustment means that need coolant and thermal conduits, there is more space left in each module 92''' for accommodating more cells 920'''. Another advantage of the thermoelectric cooler 10''' is its simple structure and thus has a longer service life because it does not have movable mechanical parts that usually produce noise and require more maintenance. The heat drawn by the thermoelectric cooler 10''' can be reclaimed to generate electricity. In this embodiment, the thermoelectric coolers 10''' are connected in parallel, so that failure of one thermoelectric cooler would not affect function of the other coolers. In this embodiment, each battery module is provided with a thermoelectric cooler, which can be used as a small temperature adjustment unit. Of course, those skilled in the art can understand that the control circuits respectively for the temperature sensors and the thermoelectric cooler for the module can be integrated in a control board.

Figure 9:
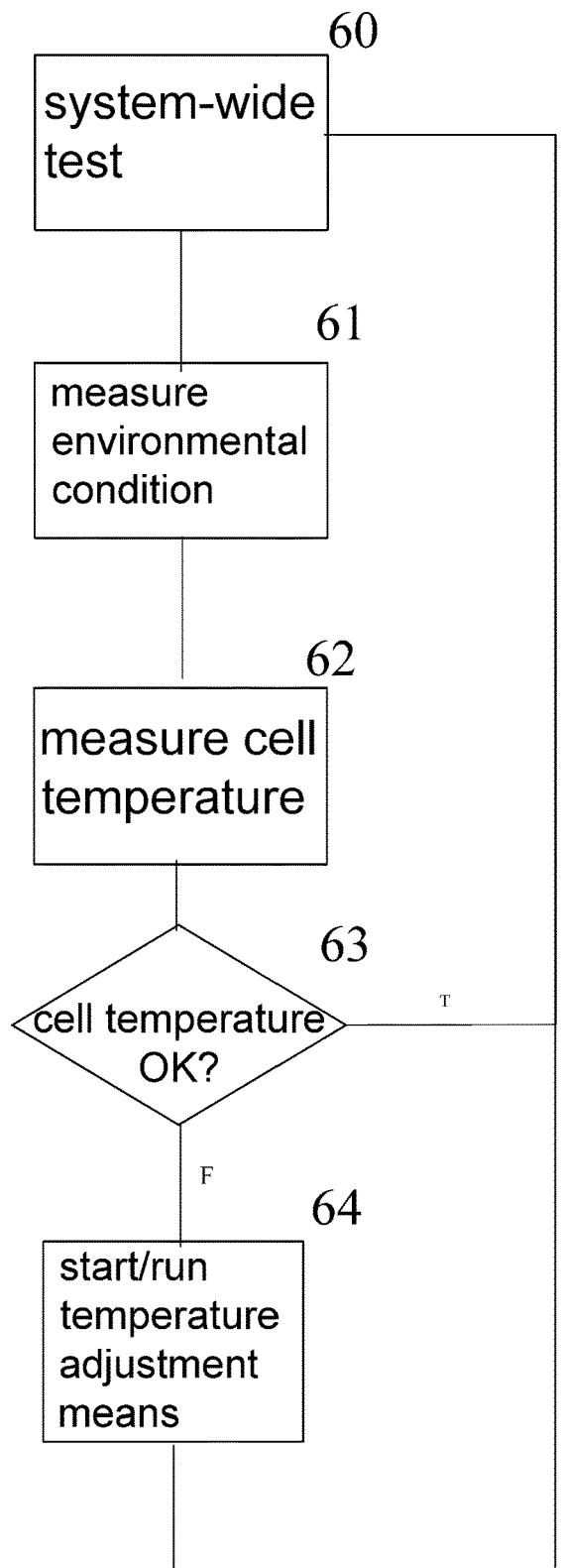
FIG. 9 shows a flowchart illustrating a control sequence for the system shown in FIG. 7.

Since an independent charging station 96" is usually provided with a communication device, a remote management unit can communicate with the station. FIG. 9 shows a flowchart of a control sequence of the thermal management system. In step 60, the microcontroller 3''' executes a system-wide test. In step 61, the microcontroller 3''' receives the environmental information (such as temperature and rainfall in the nearby area) for the next few hours from a weather forecast unit by way of the communication device 24'''. In step 62, the microcontroller 3''' receives the temperatures of the cells 920''' from the temperature sensors 20'''. In step 63, the microcontroller predicts the future temperatures of the cells the according to the current temperatures of the battery cells and various variables or parameters such as the environmental heat and the heat produced by the battery cells; if a high temperature is predicted, step 64 will be executed, wherein the thermoelectric cooler 10''' can be energized to cool the cells 920'''. Consequently, the temperatures of the cells 920''' each can be reduced by 1 degree Celsius (as an example) in order to offset the incoming high environmental temperature.

With the capability to calculate and predict the thermal energy influx to the battery cells and the battery enclosure, the thermal management system of the present invention operates the temperature adjustment means in a different way than conventional systems, wherein the thermal adjustment means of the present invention can be started before a battery temperature rise, whereas the conventional temperature adjustment means is started only after battery temperature rises, and usually accompanied with an excessive cooling afterward. Preferably, batteries can be located in a basement provided with a heat insulation layer, such as rubber and file-resistant cotton interlayer, so that external heat sources are not easy to affect the temperatures of the battery cells, and thus the temperatures of the battery cells can be predicted more accurately and the temperature control more tightly.

Figure 10:
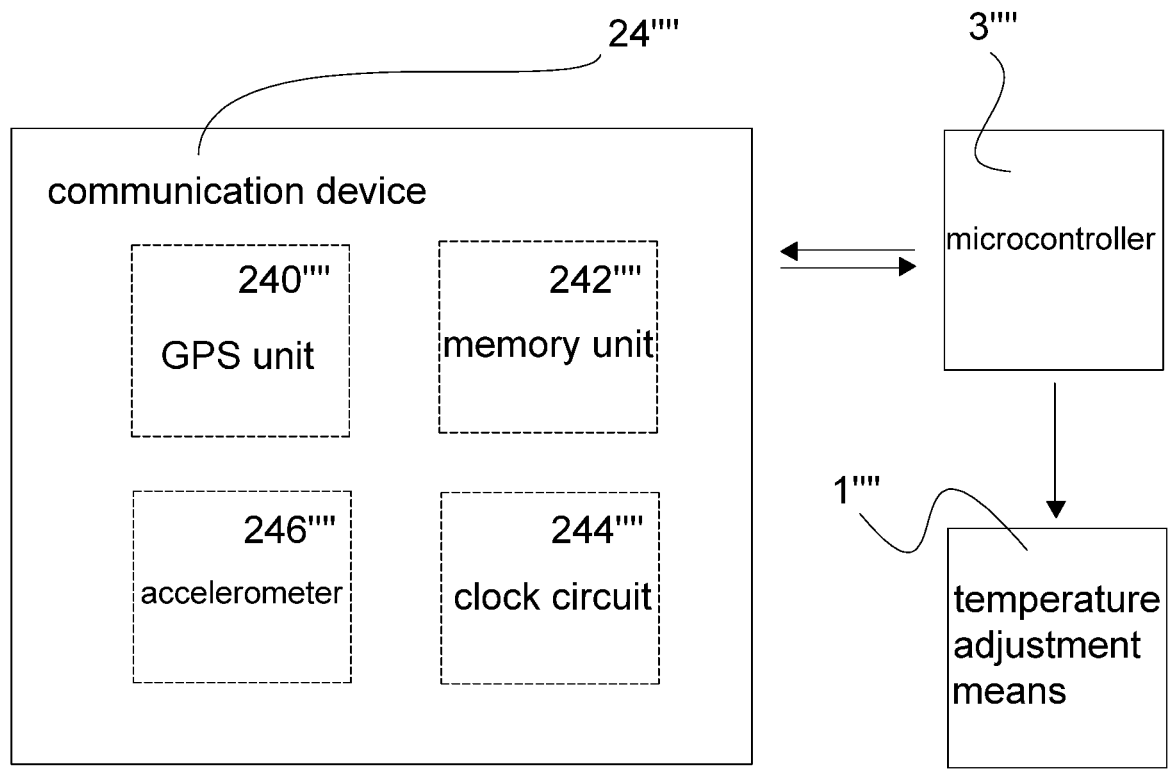
FIG. 10 shows a schematic diagram of a thermal management system for a battery pack for high power electrical equipment according to a fourth embodiment of the present invention.
Figure 11:
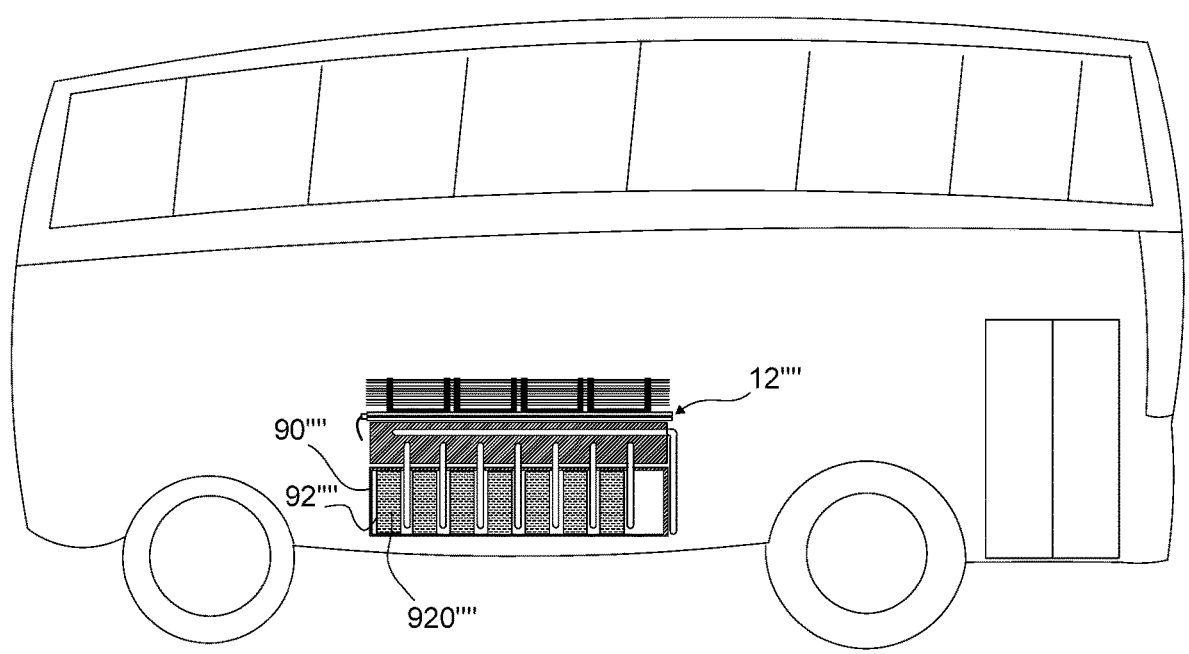
FIG. 11 shows a sectional view of an electric bus that uses the thermal management system shown in FIG. 10.

Of course, in the present invention, temperature adjustment and control on a battery pack is not limited to cooling the battery cells only. FIGS. 10 and 11 show a thermal management system according to a fourth embodiment of the present invention, which is used in an electric bus that travels on a fixed route in which the external environment parameters are more predictable. The temperature of the battery cells 920'''' is not the only factor that the microcontroller relies on to enable/disable the thermal adjustment means. The thermal management system of the electric bus can use the environmental data as variables or parameters to evaluate the environmental influence. By measuring the temperatures and the remaining capacity of the battery pack in combination with the environmental data, a predetermined temperature threshold, which serves as a comparison basis for starting/stopping temperature adjustment mean, can be obtained so that the battery modules 92'''' can be operated at an optimum temperature. If the remaining capacity of the battery pack is sufficient, temperature variation of each battery cell 920'''' can be controlled within 1 degree Celsius.

For an electric bus in winter climate, there is a risk of the battery cells 920'''' gradually cooled down below freezing point, at which time the battery cells cannot be discharged or charged. Under these circumstances, the thermal management system should keep working regardless of whether the electric bus is running or not; that is to say, when the bus is idle and not being charged, the battery cells 920'''' need to be heated frequently to ensure the temperatures thereof to be maintained above freezing point.

Because the temperature adjustment means 1'''', the sensing means (not shown), and the microcontroller 3'''', which are similar to the counterparts of the previous embodiments, are not repeated here to save space. During the travel of the electric bus, except for the short rest when arriving at the destination, there was no proper time to charge the battery cells. Battery charging has to be performed on each short break, and thus battery charging is usually set at a large current, which leads to a large amount of heat produced in the battery pack, which is significantly higher than the heat produced in the discharging process while the bus is driving. This means that cooling for the charging process is more important than the discharging process. Especially, when the temperature in the cells 920'''' is high and far greater than that of the outside, an electric generator made of a thermoelectric material can be used to absorb the heat generated in the cells for generating electricity, so as to reduce electrical power consumption. It is noticed that the thermoelectric cooler can be converted into a heater by applying a reverse current. Through the thermoelectric heater, the battery cells 920'''' can be prevented from damages and accidents due to the low temperature.

In winter, the electric bus may require heat supply while the bus is idle or stopped, although the battery pack needs to be cooled while the bus travels, that is to say, the electric bus requires both cooling and heating when used in high latitudes. Additionally, the bus need heat supply for passengers therein. Under these circumstances, the thermoelectric cooler can be thermally connected with a liquid conduit that is connected to the large temperature adjustment unit 12'''', so that the heat contained in the battery enclosure 90'''' and the battery modules 92'''' can be reclaimed through the liquid conduit to enter the passenger compartment of the bus.

In this embodiment, the sensing means includes a plurality of temperature sensors for measuring the temperatures of the battery cells. Also, a communication device 24'''' includes a GPS unit 240'''', a memory unit 242'''', which stores map data and average temperatures of areas around the world, and a clock circuit 244''''. While the electric bus travels on a predetermined route, according to the data sent from the GPS unit 240'''', the microcontroller 3'''' can make sure of the position of the electric bus. Furthermore, according to the temperature data along the travel route contained in the memory unit 242'''' in conjunction with the current time provided from the clock circuit 244'''', the environmental influence on the temperatures of the battery cells in the near future can be evaluated. If the evaluation result shows that the temperatures of the battery cells may be out of their suitable operating temperature range, the microcontroller 3'''' will enable the temperature adjustment means 1''''. Moreover, additional temperature sensors can be provided to measure the temperature within the bus and the temperature outside the bus. The capacity sensors collaborated with the temperature sensors facilitates the electric bus to achieve the purpose of intelligent driving.

In this embodiment, the thermal management system may further includes an acceleration sensor or accelerometer 246'''', which can collaborate with the vehicle control unit (VCU) and the battery management system (BMS) to determine the amplitude of vibration to confirm whether or not the electric bus has suffered an impact. If an impact is confirmed, the microcontroller 3'''' can command the temperature adjustment means 1'''' to run at its greatest capacity to quickly cool the battery modules 92'''', so that electrolyte leakage of the cells 920'''' or electrolyte vaporization that breaks the cell encapsulation due to high temperature can be avoided. Even though the battery cells 920'''' have been damaged, since the cells 920'''' have been cooled down to a low temperature, burning and chain reactions in the battery pack is minimized.

In the fourth embodiment, the thermal management system does not only consider the temperatures measured at the battery cells, but also the remaining capacity of the battery pack and the environmental condition. Through evaluation of those variables, a proper control sequence can be taken. When the remaining capacity of the battery pack is insufficient, the distance that the bus can travel would be considered first so as to prevent it from being forced to stop by the road. By evaluating the influence of environmental heat sources on the battery cells, a proper temperature control can be taken in advance, so that variation of the temperature of each cell may be within a small range, such as 1 degree Celsius. As such, the battery cells can work more effectively and efficiently, the service life of the battery cells can be extended, the cost of operating the electrical equipment (such as an electric bus) can be reduced. Upon an external impact, the battery cells can be cooled down fast, leading to a quick release of its stored energy and thus avoiding burning and explosion accidents.

Figure 12:
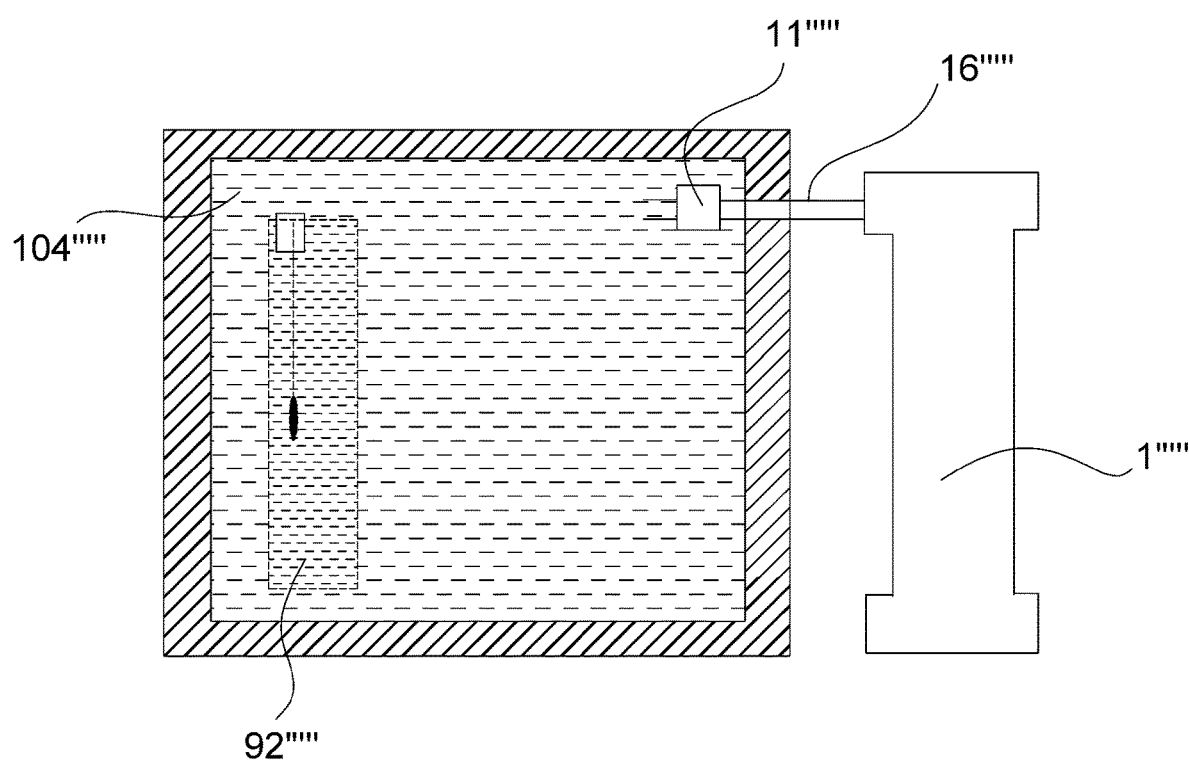
FIG. 12 shows a schematic view of a thermal management system for a battery pack for high power electrical equipment according to a fifth embodiment of the present invention.

FIG. 12 shows a fifth embodiment of the present invention, wherein the battery module 92'''''' is immersed in the coolant 104'''''', such as an insulating cooling oil, wherein a thermal conduit 16'''''' made of a specific thermally conductive material can be used. In this configuration, a lot of conduits as used in the previous embodiments can be saved. Immersion of the battery module 92'''''' in the coolant maximizes the thermally conductive area of the module and thus may increase the heat transfer. A pump 11'''''' is provided to force the coolant 104'''''' to flow through the thermal conduit 16'''''' to enter the temperature adjustment means 1'''''', where the coolant can be cooled down. Since the temperature adjustment means, the sensing means, and the microcontroller are similar to those used in the previous embodiments, descriptions therefor are omitted here. Of course, those skilled in the art can understand that the battery module 92'''''' can be entirely or partly immersed in the coolant and cooperated with the thermal conduit and/or temperature adjustment means together with heat dissipation accessories (such as dissipation fins or cooling fans) to achieve the purpose of dissipating heat without hindering implementation of the present invention.

The coolant can be an insulating cooling oil, which has a high ignition point. When high power electrical equipment, such as an electric vehicle, is impacted, the battery cells can be damaged to cause leakage of the electrolyte. However, the insulating oil can mix with the highly volatile electrolyte to protect the electrolyte from causing other damages, thus increasing the security of the electrical equipment.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the scope of the invention.

What is claimed is:

1. A system for a battery pack being used to drive high power electrical equipment, wherein the battery pack includes multiple cells located in at least one enclosure, and the system enables the cells to work at a predetermined range of temperature; the system comprising:

at least one small temperature adjustment unit, at least one large temperature adjustment unit that has a thermal adjustment capacity greater than the small temperature adjustment unit, and at least one selector capable of operating the small temperature adjustment unit and the large temperature adjustment unit, wherein the small temperature adjustment unit is thermally connected to the cells, whereas the large temperature adjustment unit is thermally connected to the enclosure;

at least one temperature sensor capable of measuring temperature of the cells, and at least one capacity sensor capable of measuring remaining capacity of the cells available for the electrical equipment, the temperature sensor capable of outputting signals representative of the temperature of the cells, the capacity sensor capable of outputting signals representative of the remaining capacity of the cells; and a microcontroller capable of receiving the signals from the temperature sensor and the capacity sensor, wherein the microcontroller decides whether or not to enable the small temperature adjustment unit, the large temperature adjustment unit, and the selector according to the signals of the temperature of the cells, and then operates the selector to start the small temperature adjustment unit; wherein when the remaining capacity of the battery pack is low, the system is configured to start the small temperature adjustment unit to reduce energy consumption of the battery pack when the small temperature adjustment unit, the large temperature adjustment unit, and the selector are enabled.

2. The system of claim 1, wherein the cells are grouped into a plurality of modules; and wherein the system includes more than one temperature sensor capable of measuring temperature of each module, and more than one capacity sensor capable of measuring remaining capacity of each module.

3. The system of claim 1, wherein the modules are located in the enclosure, in which a coolant is provided and thermally associated with the large temperature adjustment unit.

4. The system of claim 3, further comprising a pump, a thermal conduit and a circulation conduit for the coolant, wherein the thermal conduit connects the enclosure to the pump, and the circulation conduit connects the selector to the enclosure.

5. A method for system for a battery pack being used to drive high power electrical equipment, the battery pack including multiple cells that are located in at least one enclosure, the system including at least one small temperature adjustment unit, at least one large temperature adjustment unit that has a thermal adjustment capacity greater than the small temperature adjustment unit, and at least one selector capable of operating the small temperature adjustment unit and the large temperature adjustment unit, the small temperature adjustment unit being thermally connected to the cells, the large temperature adjustment unit being thermally connected to the enclosure; at least one temperature sensor to measure temperature of the cells, and at least one capacity sensor to measure remaining capacity of the cells available for the electrical equipment; a microcontroller, so that the cells are maintained at a predetermined range of temperature; the method comprising:

(a) configuring the temperature sensor to measure temperature of the cells and to output signals representative of the temperature, and configuring the capacity sensor to measure remaining capacity of the cells and to output signals representative of the remaining capacity; and (b) configuring the microcontroller to receive the signals from the temperature sensor and the capacity sensor, wherein the microcontroller decides whether or not to enable the small temperature adjustment unit, the large temperature adjustment unit, and the selector according to the signals of the temperature of the cells, and then operates the selector to start the small temperature adjustment unit; wherein when the remaining capacity of the battery pack is low, the system is configured to start the small temperature adjustment unit to reduce energy consumption of the battery pack when the small temperature adjustment unit, the large temperature adjustment unit, and the selector are enabled.

* * * * *